United States Patent [19]
Moss et al.

[11] Patent Number: 5,477,366
[45] Date of Patent: Dec. 19, 1995

[54] OPTICAL TRANSMISSION SYSTEM

[75] Inventors: Jonathan P. Moss, Woodbridge; Peter Hodgson, Leeds, both of United Kingdom

[73] Assignee: British Telecommunications public limited company, London, England

[21] Appl. No.: 741,525

[22] PCT Filed: Mar. 16, 1990

[86] PCT No.: PCT/GB90/00406

§ 371 Date: Oct. 1, 1991

§ 102(e) Date: Oct. 1, 1991

[87] PCT Pub. No.: WO90/10979

PCT Pub. Date: Sep. 20, 1990

[30] Foreign Application Priority Data

Mar. 16, 1989 [GB] United Kingdom .................. 8906093

[51] Int. Cl.⁶ .................................................. H04B 10/04
[52] U.S. Cl. ...................... 359/158; 359/180; 359/188
[58] Field of Search ........................... 359/154, 158, 359/173, 180, 181, 182, 186, 188, 189, 195; 375/45, 113, 121, 8; 455/45, 60, 61

[56] References Cited

U.S. PATENT DOCUMENTS

| | | | |
|---|---|---|---|
| 4,061,577 | 12/1977 | Bell | 250/199 |
| 4,393,516 | 7/1983 | Itani | 359/158 |
| 4,435,850 | 3/1984 | Bowen et al. | 359/182 |
| 4,450,554 | 3/1984 | Steensma et al. | 359/152 |
| 4,475,212 | 10/1984 | McLean et al. | 359/181 |
| 4,501,021 | 2/1985 | Weiss | 359/110 |
| 4,694,504 | 9/1987 | Porter et al. | 359/158 |
| 4,713,841 | 12/1987 | Porter et al. | 455/608 |
| 4,748,644 | 3/1988 | Silver et al. | 375/121 |
| 4,894,847 | 1/1990 | Tjahjadi et al. | 375/121 |

FOREIGN PATENT DOCUMENTS

| | | | |
|---|---|---|---|
| 3010802 | 9/1981 | Germany . | |
| 3517925 | 11/1986 | Germany . | |
| 58-91035 | 5/1983 | Japan | H04B 9/00 |

*Primary Examiner*—Leo H. Boudreau
*Assistant Examiner*—R. J. Bacares
*Attorney, Agent, or Firm*—Nixon & Vanderhye

[57] ABSTRACT

An optical transmission system comprises an optical transmitter (1) for launching optical signals into an optical fibre, and drive means (4 to 9) for driving the optical transmitter independently with first and second electrical signals. The drive means is such that the optical transmitter (1) transmits first and second optical signals corresponding to the first and second electrical signals.

19 Claims, 1 Drawing Sheet

OPTICAL TRANSMISSION SYSTEM

This invention relates to an optical transmission system, and in particular to a system which provides for transmission of synchronous digital data over a continuously variable range of clock frequencies.

As optical fibre transmission systems increasingly find applications in local area networks (LANs) and in-building environments, techniques to improve the network flexibility are increasingly being sought after by system planners. One such improvement would be to connect a number of different types of terminal equipment, such as telephones, fax machines, computers etc., to the same transmission line, which would result in a simpler and cheaper network. Additionally, such a system would be easier to maintain, and be physically smaller at the desk. Potentially, a single, optical terminal could provide ports for many different types of office equipment.

A positive step towards this goal is a transmission system which transports clock and data over a range of data rates, without the need to change any of the system parameters. Known synchronous optical transmission systems, however, generally operate at one specific data rate, since clock recovery from the transmitted data stream is usually required to regenerate the data itself. Thus, a standard synchronous transmission system requires a narrow band-pass filter to extract the component at the clock frequency. However, a system operating at a different rate, would require a different band-pass filter to extract a clock component from the transmitted signal. Each conventional synchronous system is, therefore, restricted to operate at one data rate only.

The problem preventing variable rate transmission systems originates through the requirement for a fixed narrow bandpass (high Q) filter to extract a component at the clock frequency from the data. Although phase locked loops can be used to track the frequency of the incoming signal, they are limited to a narrow spread of data rates by their tracking range.

The present invention provides an optical transmission system comprising an optical transmitter for launching optical signals into an optical fibre, and drive means for driving the optical transmitter independently with first and second electrical signals, the drive means being such that the optical transmitter transmits first and second optical signals corresponding to the first and second electrical signals, wherein the first electrical signals are clock signals, and the second electrical signals are data signals.

In a preferred embodiment, the first and second electrical signals are in separate regions of the radio frequency (RF) spectrum. Preferably, one of the optical signals in a baseband signal, the other optical signal being a sub-carrier multiplexed signal.

Advantageously, each of the electrical signals is passed through a respective filter positioned upstream of the optical transmitter. Each of the filters may be a 3rd order Butterworth low-pass filter. Conveniently, said one optical signal corresponds to the first electrical signal, and a modulator is positioned between the filter for the second electrical signal and the optical transmitter. In this case, the system may further comprise an oscillator for supplying a carrier frequency to the modulator, the modulator using coherent FSK to modulate the second electrical signals onto the carrier.

In a preferred embodiment, the clock signals and the data signals are provided by an externally-clocked data set providing clock signals and NRZ PRBS data signals over the range 100 kHz to 2.5 mHz.

The optical transmission system may be combined with an optical receiver system, the optical receiver system including an optical receiver for converting the first and second optical signals received from the optical transmission system into third and fourth electrical signals corresponding thereto.

This combination may further comprise means for retiming the fourth electrical signal with respect to the third electrical signal. Conveniently, a D-type flip-flop constitutes the means for retiming the fourth electrical signal with respect to the third electrical signal.

Advantageously, the combination further comprises respective filters positioned in respective parallel baths from the optical receiver to the flip-flop, each filter being effective to filter out a respective one of the third and fourth electrical signals.

Preferably, the filter for the third electrical signal is a 3rd order Butterworth low-pass filter, and the filter for the fourth electrical signal is a 4th order Butterworth band-pass filter. A demodulator may be positioned between the filter for the fourth electrical signal and the flip-flop.

Advantageously, the third electrical signal is applied to the clock input of the D-type flip-flop, and the output signal of the demodulator is applied to the data input of the flip-flop. Thus, the output signal of the demodulator constitutes a demodulated fourth electrical signal, so that the output from the flip-flop corresponds to the retimed demodulated fourth electrical signal which has a well-defined phase relationship to the third electrical signal.

The invention also provides an optical receiver system comprising an optical receiver for receiving independently transmitted first and second optical signals from an optical fibre, the optical receiver being effective to convert the first and second optical signals into first and second electrical signals corresponding to the first and second optical signals, and means for retiming the second electrical signal with respect to the first electrical signal.

The invention further provides an optical transceiver system comprising an optical transmitter aparatus and an optical receiver apparatus, the optical transmitter apparatus compising an optical transmitter for launching optical signals into an optical fibre, and drive means for driving the optical transmitter independently with first and second electrical signals, the drive means being such that the optical transmitter transmits first and second optical signals corresponding to the first and second electrical signals, and the optical receiver apparatus comprising an optical receiver for receiving third and fourth optical signals from an optical fibre, the optical receiver being effective to convert the third and fourth optical signals into third and fourth electrical signals corresponding to the third and fourth optical signals, and means for retiming the fourth electrical signal with respect to the third electrical signal.

The invention also provides a method of transmitting clock signals and data signals over an optical fibre by launching optical signals corresponding to the clock signals and the data signals into the optical fibre using an optical transmitter, the method comprising the step of launching the optical signals into the fibre by driving the optical transmitter independently with clock signals and data signals.

Preferably, one of the optical signals is launched as a baseband signal, the other optical signal being launched in the form of a sub-carrier multiplexed signal.

An optical fibre transmission system constructed in accordance with the invention will now be described in greater detail, by way of example, with reference to the accompanying drawings, in which.

Figure 1:
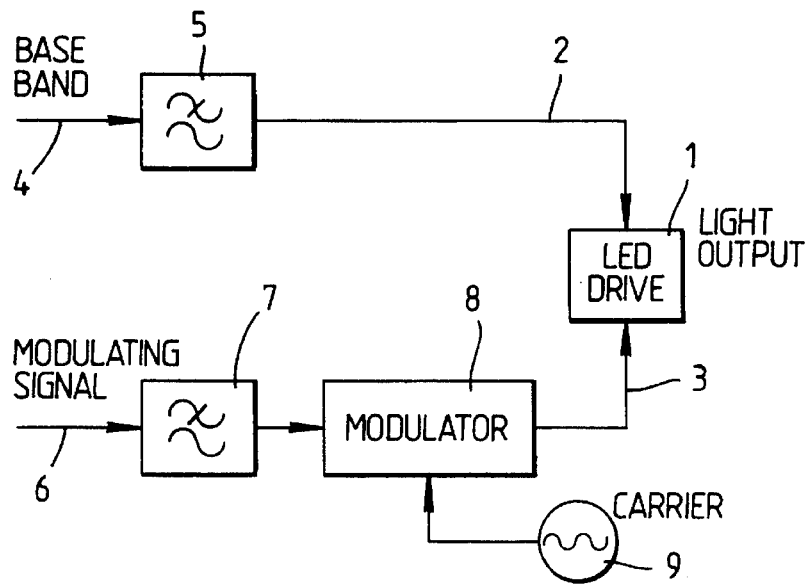
FIG. 1 is a schematic circuit diagram showing the transmitter of the system.

Referring to the drawings, FIG. 1 shows the transmitter of the optical fibre transmission system, the transmitter including an LED 1 for launching optical signals into an optical fibre (not shown). The optical transmission system operates at 850 nm and has a power reduction of 3 dB at 18 MHz. The LED 1 is driven by clock signals (via an input line 2) and by modulated data signals (via an input line 3), the clock signals and the data signals being in separate regions of the RF spectrum. The clock signals and the data signals are provided by an externally-clocked data test set providing clock signals and non return to zero (NRZ) data signals as a pseudo random bit sequence (PRBS) over the range 100 kHz to 2.5 MHz. The clock signals are fed to the line 2 from an input line 4 via a 3rd order Butterworth low-pass filter 5 rated at 3 MHz. The data signals are fed to the line 3 from a data input line 6 via a 3rd order Butterworth low-pass filter 7 rated at 3 MHz and a Philips NE 564 modulator 8. The modulator 8 uses coherent frequency shift keying (coherent FSK) to modulate the data signals onto a carrier of frequency 7.35 MHz which is input to the modulator by an oscillator 9. Thus, by modulating the data signals onto the carrier, and transmitting the clock signals as a baseband signal, clock and data are transported independently. The filters 5 and 7 limit the frequency content of the modulated transmitted optical signal, which leads to a reduction in the sideband signal and hence helps prevent crosstalk.

The receiver (see FIG. 2) includes an optical receiver 10 which converts optical signals carried by the optical fibre into electrical signals on a line 11. These electrical signals are amplified by a National LM733 amplifier 12. The output of the amplifier is fed, in parallel, to a 3rd order Butterworth low-pass filter 13 rated at 3 MHz, and to a 4th order Butterworth band-pass filter 14 having a pass range of from 5 MHz to 11 MHz. The filter 13 extracts the clock signals, and the filter 14 extracts the carrier modulated by the data signals. The extracted clock signals are amplified by a National LM733 amplifier 15 whose output is fed to one input of a D-type flip-flop 16. The extracted carrier/data signals are passed to a Philips NE564 demodulator 17 which extracts the data signals from the carrier and feeds them to the other input of the flip-flop 16. The flip-flop 16 synchronises the clock and data signals at its outputs 18.

By modulating the carrier with the data signals, and transmitting the clock signals as a baseband signal, the two types of signal are transported independently. Consequently, there is no requirement for narrow band-pass filters for extracting the clock components at different operating rates, so that the system described above provides simultaneous clock and data transport at variable transmission rates.

Figure 3:
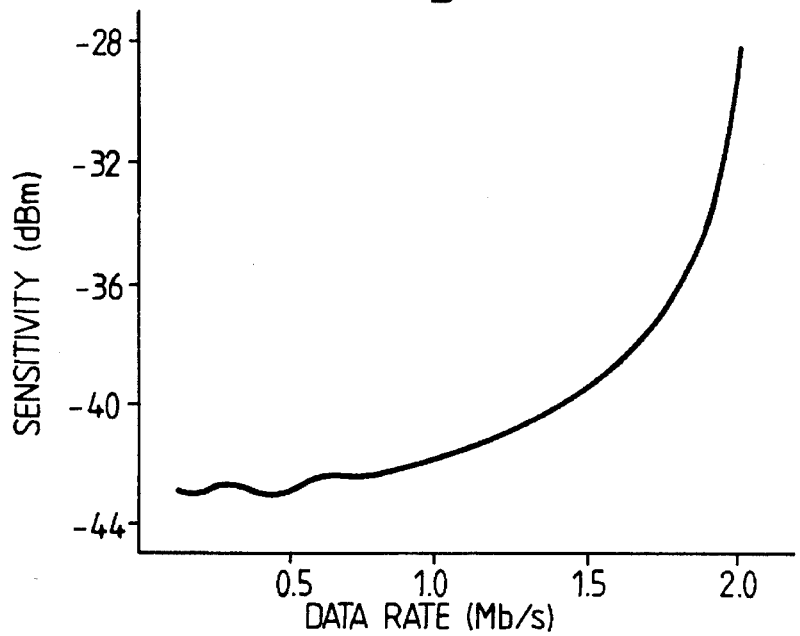
FIG. 3 is a graph showing the sensitivity of the system at various data rates.

FIG. 3 is a graph showing the optical sensitivity (which is a measure of the received optical power) against data rate. For each data rate, the received optical power is adjusted to obtain a bit error rate (BER) of $1 \times 10^{-5}$). The graph shows a generally constant system sensitivity of −42 dBm up to a data rate of about 1 Mb/s. At higher data rates, a roll-off in sensitivity occurs as a result of a combination of performance—limiting factors, a rapid deterioration occuring after the data rate reaches about 2 Mb/s.

The performance—limiting factors referred to above are:
a) Crosstalk

As the transmitted data rate is increased, the bandwidths of the baseband and modulated signals increase. At some rate, they will have bandwidths that begin to overlap. It will then be impossible to separate the two channels, without observing some degree of interference between them. This interference manifests itself as jitter, and causes system errors. Crosstalk is reduced by the use of the low pass filters 5 and 7.
b) Modulated bandwidth Using FSK for modulation, the ratio $f_d/r$ (where $f_d$ is the frequency deviation and r is the data rate) is a useful parameter when discussing the bandwidth and power spectral density (psd) of the modulated signal. For low values of $f_d/r$ (e.g. 0.3), the FSK psd has a peak at the carrier frequency ($f_c$) with smooth roll-off. The bandwidth is of the order of 2r. As $f_d/r$ increases, the bandwidth extends beyond 2r, and the psd displays two peaks at the deviated frequencies $f_c-f_d$ and $f_c+f_d$.

By pre-filtering the transmitted signals, these rates are attenuated on the band edge of the filter. This leads to a reduced sensitivity at higher rates, with a roll-off related to the filters 5 and 7 in the transmitter, as well as to the filters 13 and 14 used to separate the channels in the receiver.
c) Phase relationship Because the clock is not recovered from the same signal as the data, but is transported independently, it will suffer delays through the various filters and recovery processes different from those experienced by the data, and this relative delay varies as the data rate is changed. Clock edges occuring too soon or too late relative to the centre of the data 'eye' will result in a sensitivity penalty, if set up and hold times of any re-timing element are not met.

A technique, such as automatically inverting the clock, could be used to overcome this problem. Thus, when one edge of the clock is too close to the data cross-over, inverting the clock shifts its phase, by n radians, towards the centre of the data 'eye'. Either inverted or non-inverted clock should ensure no noticeable errors due to poor relative phase of the data and clock.

The penalty paid in using higher order filters with steeper roll-offs to limit or recover the channels, is the effect on the group delay of the filters; a higher order filter having, in general, a larger peak in the group delay, where the filter begins to roll-off. This leads to large variations in the phase difference of the data and clock at the re-timing D-type flip flop 16.
d) Linearity It is essential that, once the two signals are combined, the transmission system is linear, until after the signals are split in the receiver. This avoids interference between the two channels, due to changes in their frequency spectra caused by non-linearities. The optical transmitter and receiver are designed to be linear, to have no noticeable effect on the transmitted spectrum.
e) Modulation/demodulation The abilities of the modulator 8 and the demodulator 17 to transmit and recover the modulating signal eventually imposes a restriction on the maximum data rate r, due to r being too high a percentage of $f_c$. This is an inherent limitation of the system.
f) Carrier/frequency A major source of impairment as the transmission rate is increased is the interference between the baseband and carrier signals.

The modulation index of the carrier signal is, therefore, chosen to yield optimum error performance at the approximate maximum rate. Thus, if T is the period of the modulating signal, $W_c$ is the carrier frequency, and $W_d$ is the single-sided frequency deviation, it can be shown that the minimum probability of an error occurs when:

$$2W_dT=3n/2,$$

assuming that $W_cT \gg 1$ and $W_c \gg W_d$

For a system operating at maximum rate of 2Mb/s, a frequency deviation, $f_d$, of approximately 750 kHz is the theoretical optimum. To maintain the validity of the assumption that $W_c \gg W_d$, the optimum carrier frequency for 2Mb/s operation is in the region of 7.5 MHz, this leading to the choice of 7.35 MHz for the carrier frequency in the system described above.

The major contributor to the system limitation is the crosstalk between the channels. The crosstalk from the baseband channel (clock) to the carrier channel, has a slightly greater effect than that from the carrier channel to the baseband channel, probably because the clock harmonics in the region of the carrier frequency are of larger amplitude than that of the modulated signal at the clock frequency.

The modulation/demodulation process operates successfully at data rates beyond 2 Mb/s. For example, a bit error-rate less than $1 \times 10^{-8}$ is achieved at a data rate of 2.2 Mb/s, when the received optical power is −34 dBm.

Figure 2:
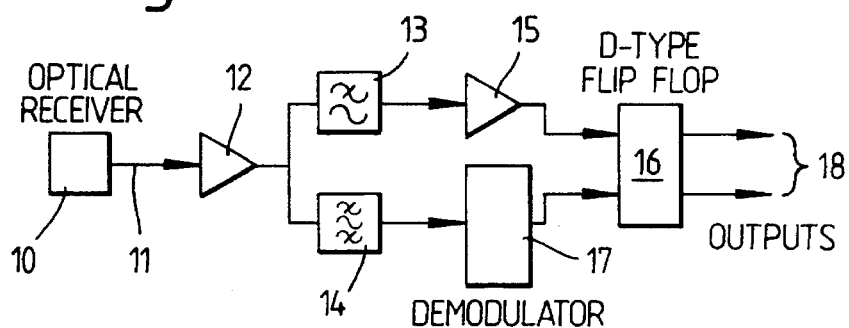
FIG. 2 is a schematic circuit diagram showing the receiver of the system.

The system shown in FIGS. 1 and 2 is a simplex system which could be used in an information—providing service. In this case, a single transmitter would service a plurality of receivers via a passive optical network (PON). Alternatively, where duplex operation is required, transceivers would be coupled to a PON, each transceiver being consituted by a combination of the transmitter of FIG. 1 and the receiver of FIG. 2.

The system described above could be modified in a number of ways. For example, the data signals could be the baseband signal, and the clock signals could be modulated onto the carrier. The 'clock on carrier' system exhibits similar characteristics to the 'data on carrier' system, the overall sensitivity being −38 dBm. In addition to the crosstalk between channels, however, the modulation/demodulation process limits the system performance. This is because of the nature of the spectrum of a clock signal, and that of a signal when modulated by the clock. Thus, the clock information is mainly contained in a single frequency at the clock rate; and, when this is used to modulate the carrier, the bandwidth of the modulated signal is wider than in the case of data modulating the carrier. Clock information is then lost when the carrier channel band-pass filter 14 attenuates important components of the modulated signal, resulting in reduced sensitivity. In order to achieve similar performance to the 'data on carrier' technique, the 'clock on carrier' system would require a higher carrier frequency, and a wider band-pass filter in the receiving circuitry, leading to overall wider system bandwidth.

Although FSK is the prefered modulation technique, other methods of sub-carrier multiplexing (frequency division multiplexing) could be used instead. Moreover, the technique of sub-carrier multiplexing could be extended to provide LAN users with a series of flexible networks, using the same transmission system, by transmitting the signals from various items of office equipment on different carrier frequencies. The use of optical fibre in the LAN, and in the in-building environment, can thus be made more economical.

It will be apparent that the system described above enables simultaneous transport of clock and data signals at variable rates of transmission. This is particularly advantageous in LANs which exploit the potentially enormous bandwidth of an optical fibre transmission system. Thus, using the system described above, many different signals from different sources could each be assigned a carrier frequency, and transported through the same optical fibre. At the receiver, various filters could pick off the desired carriers, which would undergo a demodulation process, to provide the user with the associated data signal. The system could also be used to provide an upgrading facility, allowing extra transmission capacity to be provided, without the need to change an existing transmission network.

Faster electro-optic devices will, in general be required for the variable rate system described above, as compared to the electro-optic devices used in conventional systems operating at the maximum data rate of the variable system. As demand for suitable electro-optic devices for LANs increased, so the cost penalty for the extra speed should reduce, meaning greater network flexibility at little extra cost.

We claim:

1. An optical transmission system which provides for transmission of synchronous digital data over a continuously variable range of clock frequencies, the transmission system comprising:

an optical transmitter for launching optical signals into an optical fibre, and drive means for driving the optical transmitter independently with first and second electrical signals, the drive means being such that the optical transmitter transmits first and second optical signals corresponding to the first and second electrical signals, wherein the first electrical signals are variable rate clock signals, the second electrical signals are variable rate data signals, and the first and second electrical signals are in separate regions of the RF spectrum.

2. A system as claimed in claim 1, wherein one of the optical signals is a baseband signal, the other optical signal being a sub-carrier multiplexed signal.

3. A system as claimed in claim 1, wherein each of the electrical signals is passed through a respective filter positioned upstream of the optical transmitter.

4. A system as claimed in claim 3, wherein each of the filters is a 3rd order Butterworth low-pass filter.

5. A system as claimed in claim 3, wherein said one optical signal corresponds to the first electrical signal, and a modulator is positioned between the filter for the second electrical signal and the optical transmitter.

6. A system as claimed in claim 5, further comprising an oscillator for supplying a carrier frequency to the modulator, the modulator using coherent FSK to modulate the second electrical signals onto the carrier.

7. A system as claimed in claim 1, wherein an 850 nm LED constitutes the optical transmitter.

8. A system as claimed in claim 1, wherein the clock signals and the data signals are provided by an externally-clocked data set providing clock signals and NRZ PRBS data signals over the range 100 kHz to 2.5 mHz.

9. An optical transmission system in combination with an optical receiver system, the optical transmission system being as claimed in claim 1, and the optical receiver system including an optical receiver for converting the first and second optical signals received from the optical transmission system into third and fourth electrical signals corresponding thereto.

10. A combination as claimed in claim 9, further comprising means for retiming the fourth electrical signal with respect to the third electrical signal.

11. A system as claimed in claim 10, wherein a D-type flip-flop constitutes the means for retiming the fourth electrical signal with respect to the third electrical signal.

12. A combination as claimed in claim 11, further comprising respective filters positioned in respective parallel paths from the optical receiver to the flip-flop, each filter being effective to filter out a respective one of the third and fourth electrical signals.

13. A combination as claimed in claim 12, wherein the filter for the third electrical signal is a 3rd order Butterworth low-pass filter, and the filter for the fourth electrical signal is a 4th order Butterworth band-pass filter.

14. A combination as claimed in claim 13, wherein a demodulator is positioned between the filter for the fourth electrical signal and the flip-flop.

15. A combination as claimed in claim 14, wherein the third electrical signal is applied to the clock input of the D-type flip-flop, and the output signal of the demodulator is applied to the data input of the flip-flop.

16. A combination as claimed in claim 12, further comprising an amplifier positioned downstream of the optical receiver and upstream of the parallel filters.

17. An optical receiver system comprising an optical receiver for receiving independently transmitted first and second optical signals from an optical fibre, the optical receiver being effective to convert the first and second optical signals into first and second electrical signals corresponding to the first and second optical signals, and means for retiming the second electrical signal with respect to the first electrical signal.

18. A system as claimed in claim 17, wherein a D-type flip-flop constitutes the means for retiming the second electrical signal with respect to the first electrical signal, thereby synchronising the clock and data signals which formed the basis for the first and second optical signals.

19. A system as claimed in claim 18, further comprising respective filters positioned in respective parallel paths from the optical receiver to the flip-flop, each filter being effective to filter out a respective one of the first and second electrical signals.

* * * * *